Patented Dec. 23, 1952

2,623,066

UNITED STATES PATENT OFFICE 2,623,066

PREPARATION OF BETA,BETA-DITHIO DICARBOXYLIC ACIDS AND ESTERS

James G. Murphy, Brooklyn, N. Y., and John F. Mulvaney, Jersey City, N. J., assignors to Ralph L. Evans, Bay Shore, N. Y.

No Drawing. Application June 15, 1948, Serial No. 33,234

7 Claims. (Cl. 260—526)

The present invention relates to a process for converting alpha, beta-ethylenically unsaturated carboxylic acids and their esters into beta, beta'-dithiodicarboxylic acids and beta-mercapto-carboxylic acids.

Objects and advantages of the invention will be set forth in part hereinafter and in part will be obvious herefrom, or may be learned by practice with the invention, the same being realized and attained by means of the processes, steps, and combinations pointed out in the appended claims.

The invention consists in the novel steps, processes, combinations and improvements herein shown and described.

An object of this invention is to provide a process for the conversion of alpha, beta-ethylenically unsaturated acids to beta, beta'-dithio-carboxylic acids.

Another object is to provide a process for the conversion of alpha, beta-ethylenically unsaturated acids to beta-mercapto-carboxylic acids.

A further object is to provide a process for the preparation of the aforementioned sulfur compounds which makes use of inexpensive inorganic reagents.

In general, this invention comprises reacting an alpha, beta-ethylenically unsaturated acid or its ester with a source of polysulfide ions, preferably an alkali metal or alkaline earth polysulfide. From this reaction mixture, the disulfide can be isolated as such or it may be reduced to the mercaptan.

The processes of this invention are generically applicable to alpha, beta-ethylenically unsaturated acids and their esters. For example, they are applicable to citraconic, itaconic, fumaric, and cinnamic acids. These processes are not limited to the ratio of reactants disclosed in the examples given. The sodium polysulfide may be, for example, sodium disulfide, or sodium trisulfide. In place of sodium polysulfide, any alkali metal or alkaline earth polysulfide or any compound acting as a source of polysulfide ion may be used.

The particular utility of these processes is that they produce disulfides and mercaptans in good yield by the treatment of alpha, beta-ethylenically unsaturated acids with inexpensive inorganic reagents.

These products may be used in permanent waving and depilatory compositions, as polymerization modifiers, and as intermediates in the preparation of pharmaceuticals, plasticizers, and the like.

The following examples are illustrative of embodiments of this invention:

*Example I*

258 g. methyl acrylate (3 moles) and 729 cc. of 4.12 M. sodium tetrasulfide solution (3 moles) were stirred together with external cooling. The initially immiscible liquids became homogeneous, and the temperature rose to 54° C. from room temperature.

After adding three moles of concentrated hydrochloric acid, 239.9 g. of sulfur precipitated, which was filtered off. The dithio-dihydracrylic acid remaining in solution as the disodium salt was reduced with aluminum and sodium hydroxide. Titration showed that 2.28 equivalents of mercaptan were in solution, a yield of 76%.

Acidification of the reduced solution, extraction with ether, and vacuum distillation afforded the thiohydracrylic acid, B. P. 69–73° C. at 0.33–0.70 mm.

Acid equivalent weight:
  Found, 106.1 g.
  Theory, 106.1 g.
Mercaptan equivalent weight:
  Found, 102.7 g.
  Theory, 106.1 g.

A portion of the thiohydracrylic acid was oxidized to the disulfide.

M. P. (corr.) 156.1–156.5° C.
Acid equivalent weight:
  Found, 104.9 g.
  Theory, 105.1 g.

*Example II*

86 g. (1 mole) of methyl acrylate and 243 cc. of 4.12 M. sodium tetrasulfide solution were mixed as in Example I. An exothermic reaction occurred, the initially immiscible layers became homogeneous, and the temperature rose to 75° C. from room temperature. The reaction mixture was acidified to the point where both free sulfur and the disulfide precipitated. By extracting with methanol, 97.4 g. of crude dithiodihydracrylic acid, a yield of 93%, was obtained.

*Example III*

114.1 g. of ethyl methacrylate monomer (1 mole), 122 cc. of 4.12 M. sodium tetrasulfide solution (0.5 mole) and 200 cc. of ethanol were vigorously stirred together. The initially immiscible layers became homogeneous in six minutes, and in eleven minutes the temperature had risen to 52° from 27°.

After acidifying with 1 mole of concentrated hydrochloric acid, the precipitated sulfur was filtered off. The filtrate consisted of 92.0 g. of clear, red, water-immiscible oil, as well as the aqueous phase.

The oil was extracted with 10% sodium hydroxide and the extract washed with ethyl acetate. Acidification of the aqueous phase, yielded 35.0 g. of crude beta, beta'-dithiodiisobutyric acid.

The mercaptan, beta-mercapto-isobutyric acid, was obtained by reducing the disulfide with aluminum in alkaline solution. After acidification the mercaptan was extracted with ether and distilled in vacuum. Beta-mercapto-isobutyric acid, B. P. 133–139° C. at 25 mm., was obtained.

Acid equivalent weight:
  Found, 121 g.
  Theory, 120 g.
Mercaptan equivalent weight:
  Found, 117 g.
  Theory, 120 g.

A portion of the distilled beta-mercapto-isobutyric acid was oxidized to beta, beta'-dithiodiisobutyric acid.

M. P. (corr.) 86.3–87.7° C.
Acid equivalent weight:
  Found, 119 g.
  Theory, 119 g.

*Example IV*

To 1 mole of sodium tetrasulfide solution, a solution of 86.1 g. (1 mole) of crotonic acid, dissolved in 100 cc. of dioxane, was added gradually over a three hour period with good stirring.

After standing two weeks at room temperature, 82 cc. of concentrated hydrochloric acid (1 mole) was added. The sulfur which precipitated was filtered off, and the aqueous solution containing the sodium salt of the disulfide was reduced with aluminum and sodium hydroxide. Titration showed 0.994 equivalent of mercaptan to be present, a yield of 99%.

By ether extraction of the mercaptan followed by vacuum distillation, a 63.1 g. fraction of beta-mercaptobutyric acid was isolated, boiling point 114–125° C. at 22–24 mm.

Acid equivalent weight:
  Found, 122 g.
  Theory, 120 g.
Mercaptan equivalent weight:
  Found, 118 g.
  Theory, 120 g.

*Example V*

To 116.1 g. of maleic acid (1 mole) in 200 cc. of water, 240 g. of 33.3% sodium hydroxide (2 moles) were added. To this solution 1 mole of sodium tetrasulfide solution was added and then, gradually, with good stirring, 82 cc. of concentrated hydrochloric acid (1 mole) over a two-hour period.

After standing one day at room temperature, a second mole of concentrated hydrochloric acid was added and the precipitated sulfur filtered off.

Two-thirds of the solution of the disulfide was reduced with aluminum and sodium hydroxide, whereupon titration showed that the theoretical amount of mercaptan had been produced.

Acidification, ether extraction, distillation of the extract to dryness, and crystallization once from water afforded thiomalic acid, M. P. (corr.) 151.4–152.0° C.

Acid equivalent weight:
  Found, 75.0 g.
  Theory, 75.0 g.
Mercaptan equivalent weight:
  Found, 160 g.
  Theory, 150 g.

The remaining one-third of the disulfide solution was acidified, extracted with ether, and the extract taken to dryness. This afforded 29.5 g. (a 55% yield) of a crude, stereoisomeric mixture of alpha, alpha', beta, beta'-tetracarboxy-diethyl-disulfide.

Acid equivalent weight:
  Found, 79.8 g.
  Theory, 74.5 g.

The invention in its broader aspects is not limited to the specific process and steps shown and described but departures may be made therefrom within the scope of the accompanying claims without departing from the principles of the invention and without sacrificing its chief advantage.

What is claimed is:

1. A process for the production of a beta-beta' dithiodicarboxylic acid and esters thereof comprising reacting one mole of a compound selected from the group consisting of alpha, beta ethylenically unsaturated carboxylic acids and esters of said unsaturated acids with at least one-half mole of a compound which is a source of polysulfide ions, said reaction taking place at room temperature or above.

2. The process of claim 1 in which the source of polysulfide ions is an alkali metal polysulfide.

3. The process of claim 1 in which the source of polysulfide ions is an alkaline earth polysulfide.

4. The process of claim 1 in which the source of polysulfide ions is sodium tetrasulfide.

5. The process of claim 1 in which the unsaturated acid is acrylic acid.

6. The process of claim 1 in which the unsaturated acid is crotonic acid.

7. The process of claim 1 in which the unsaturated acid is maleic acid.

JAMES G. MURPHY.
JOHN F. MULVANEY.

REFERENCES CITED

The following references are of record in the file of this patent:

UNITED STATES PATENTS

| Number | Name | Date |
|---|---|---|
| 2,402,643 | Lazier et al. | June 25, 1946 |
| 2,402,644 | Lazier et al. | June 25, 1946 |
| 2,413,361 | Martin | Dec. 31, 1946 |
| 2,450,634 | Dean et al. | Oct. 5, 1948 |

FOREIGN PATENTS

| Number | Country | Date |
|---|---|---|
| 845,793 | France | Sept. 1, 1939 |

OTHER REFERENCES

Loven, Beilstein (Handbuch, 4th. ed.), vol. 3, p. 299 (1921).